(12) United States Patent
Baumann

(10) Patent No.: US 8,029,043 B2
(45) Date of Patent: Oct. 4, 2011

(54) BODY STRUCTURE FOR A MOTOR VEHICLE

(75) Inventor: Peter Baumann, Kieselbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 4 days.

(21) Appl. No.: 12/692,745

(22) Filed: Jan. 25, 2010

(65) Prior Publication Data

US 2010/0187863 A1    Jul. 29, 2010

(30) Foreign Application Priority Data

Jan. 23, 2009  (DE) .................. 10 2009 005 867

(51) Int. Cl.
*B62D 25/04* (2006.01)
*B62D 25/02* (2006.01)

(52) U.S. Cl. ......... 296/187.12; 296/193.05; 296/193.06; 296/203.03

(58) Field of Classification Search .............. 296/187.12, 296/193.05, 193.06, 203.03, 30, 146.6
See application file for complete search history.

(56) References Cited

U.S. PATENT DOCUMENTS

| 4,973,103 | A | * | 11/1990 | Imajyo et al. | ............ 296/203.04 |
| 5,228,741 | A | * | 7/1993 | Ide | ............ 296/187.11 |
| 7,472,948 | B2 | * | 1/2009 | Yatabe et al. | ............ 296/203.04 |
| 7,533,925 | B2 | | 5/2009 | Klatt et al. | |

FOREIGN PATENT DOCUMENTS

| DE | 10007421 A1 | 8/2001 |
| DE | 10256608 A1 | 7/2004 |
| DE | 102004018745 A1 | 11/2005 |
| DE | 102006015406 A1 | 10/2007 |
| DE | 102007018474 A1 | 11/2008 |

* cited by examiner

Primary Examiner — Jason S Morrow

(57) ABSTRACT

For the reinforcement of a body structure of a motor vehicle which extends adjacent to a front side door of the vehicle, a hollow member structure formed by channel reinforcements is arranged in the body structure. The hollow member structure extends approximately in a horizontal plane from the B pillar into a rear region of the body structure. The channel reinforcements are intended to absorb, in a stable fashion, the forces which enter into the side part via the door in the event of a frontal crash.

6 Claims, 4 Drawing Sheets

BODY STRUCTURE FOR A MOTOR VEHICLE

CROSS-REFERENCE TO RELATED APPLICATION

This application claims the priority, under 35 U.S.C. §119, of German application DE 10 2009 005 867.2, filed Jan. 23, 2009; the prior application is herewith incorporated by reference in its entirety.

BACKGROUND OF THE INVENTION

Field of the Invention

The invention relates to a body structure for a motor vehicle having a side door fastened to a body pillar by hinges, which side door can be connected by a door lock to a profiled B pillar of the body. The B pillar contains an outer and an inner side part, with the outer side part being situated, with a limb turned up in the direction of the B pillar, a short distance opposite a rear web plate of the closed door.

German patent No. 10 2004 018 745 B4, corresponding to U.S. Pat. No. 7,533,925, discloses a body structure for a passenger motor vehicle, having a support device which is arranged both on a side door with an internal hollow member and also on an adjoining, lock-side body pillar. The support device has a support part on the B pillar and a further support part on the door. The support parts contain spaced-apart support surfaces which come into contact with one another in the event of a frontal crash acting on the body structure.

SUMMARY OF THE INVENTION

It is accordingly an object of the invention to provide a body structure for a motor vehicle which overcomes the above-mentioned disadvantages of the prior art devices of this general type, which, in the event of a frontal crash, ensures optimum support of a front vehicle door against an adjoining rear body structure.

With the foregoing and other objects in view there is provided, in accordance with the invention a body structure for a motor vehicle. The body structure contains a profiled B pillar and a side door to be fastened to a further body pillar by hinges. The side door is connected by a door lock to the profiled B pillar and has a rear web plate. The body structure further has an inner side part and an outer side part. The outer side part has a turned up limb in a direction of the B pillar, a short distance opposite the rear web plate of the side door in a closed position. The inner side part and the outer side part together defining a channel there between. A hollow member structure extends in a vehicle longitudinal direction and is disposed in the channel between the inner and outer side parts. The hollow member structure formed from channel reinforcements is connected to one another. The channel reinforcements have a front end supported on the turned-up limb of the outer side part. The channel reinforcements have at least one rear end connected to the inner side part.

The main advantages obtained by the invention consist in that significant stiffening of the bodywork is achieved in the event of a frontal crash by a reinforcement of the body structure behind the side door. This is obtained in that in a hollow member structure which extends in the vehicle longitudinal direction is arranged in a channel of the body structure between an inner and an outer side part, which hollow member structure is formed by channel reinforcements which are connected to one another. The channel reinforcements are held supported with a front end on a turned-up limb of the outer side part, and at least one rear end of the channel reinforcement is connected to an inner side part.

It is provided according to the invention in particular that the hollow member structure formed by the channel reinforcements is arranged in a region of the body structure directly below a lower window edge or below the belt line of the vehicle of a rear side window—as viewed in relation to the direction of travel—of the vehicle. The channel reinforcements are composed of an inner, first channel reinforcement and an outer, second channel reinforcement which are connected to one another, enclosing a cavity, so as to form the structural unit which forms the hollow member structure.

By the configuration and arrangement of the channel reinforcement, which forms the hollow member structure, within the two side parts of the body structure of the vehicle, it is advantageously obtained according to the invention that, preferably in the event of a frontal crash, forces are transmitted by the side door into the rear vehicle structure and can be effectively absorbed by the latter, and therefore, for example, the door remains in the closed position and can be easily opened.

For the effective absorption of forces via the channel reinforcement which is integrated into the rear body structure, the channel reinforcement is preferably composed of profiled shaped sheet-metal parts, with the inner channel reinforcement being connected with an upper turned-up edge to turned-up limbs of the outer and inner side parts, the upper turned-up edge forming the lower window edge of the rear side window.

It is also provided according to the invention that the inner channel reinforcement has, at the front end, a limb with an angled portion which is connected to an outer profile of the B pillar, and the limb is supported areally on the turned-up limb of the outer side part. By the areal support of the front end of the channel reinforcement on the turned-up limb, which directly faces the rear web plate of the vehicle door, of the outer side part, direct support of the vehicle door and a direct introduction of the crash forces is obtained. The direct introduction of the crash forces is also promoted in that, according to the invention, furthermore, the outer channel reinforcement is held with the front limb on the limb of the inner channel reinforcement, and both limbs are held supported together on the turned-up limb of the outer side wall. Since the channel reinforcement has a structural shape which tapers in the form of a wedge from the front connection to the B pillar and to the outer side part up to the rear connection to the inner side part, a relatively large front support surface is also obtained.

The structural unit of the channel reinforcement, preferably composed of two profiled sheet-metal parts connected to one another, can be installed or retrofitted in the vehicle in a simple pre-assembled configuration.

Other features which are considered as characteristic for the invention are set forth in the appended claims.

Although the invention is illustrated and described herein as embodied in a body structure for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
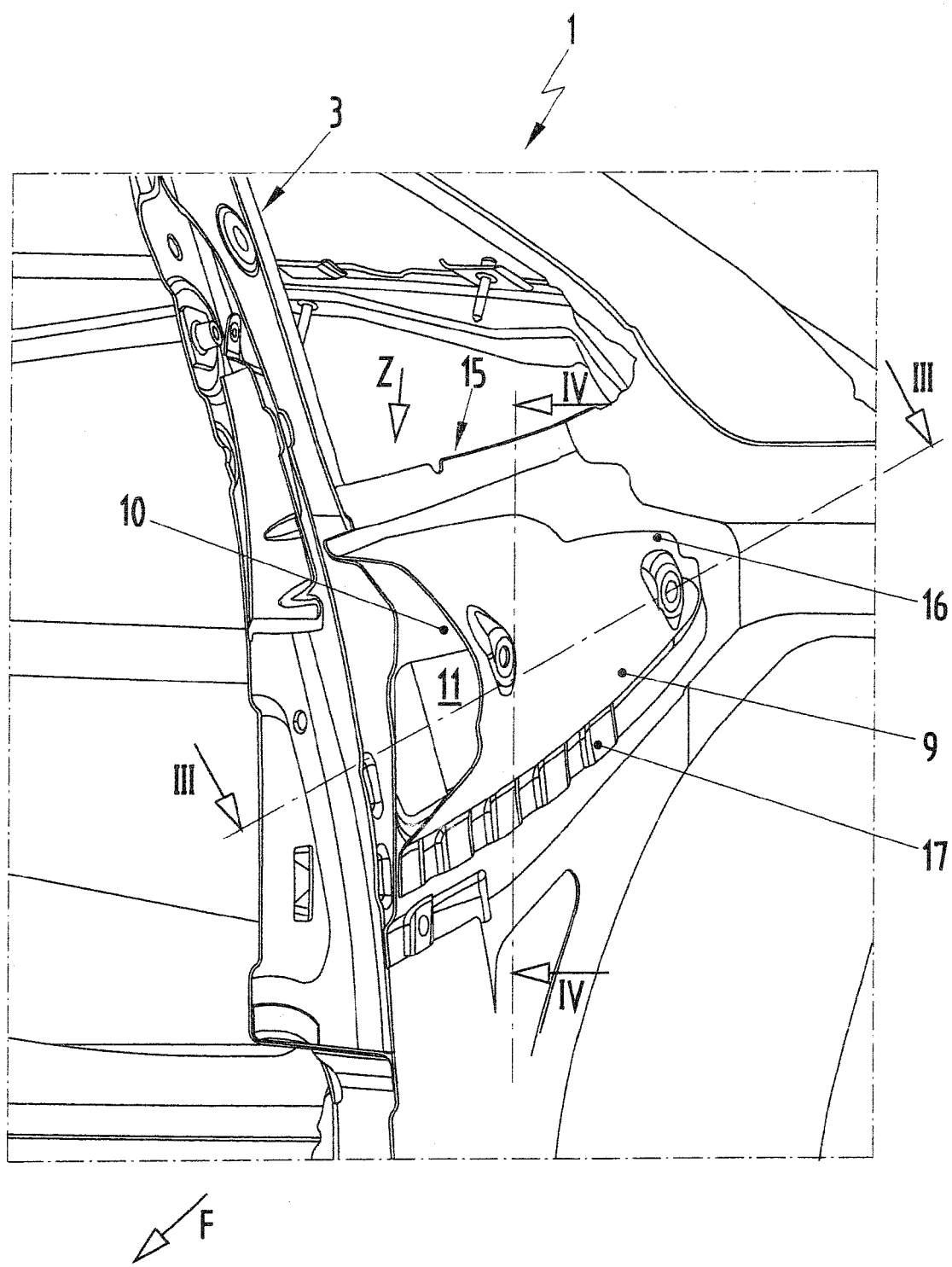
FIG. 1 is a diagrammatic perspective, partially cut-away view of channel reinforcement in an arrangement behind a B pillar of a body structure.
Figure 2:
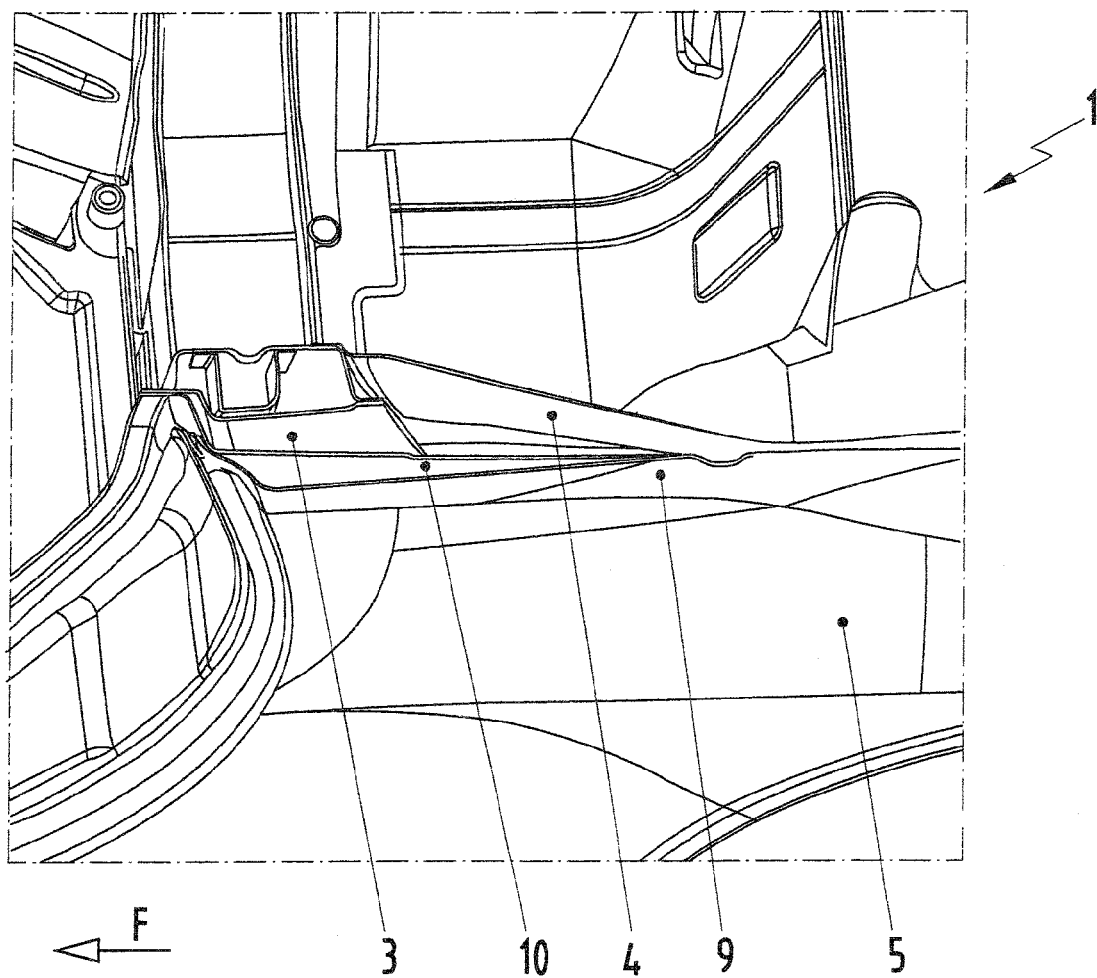
FIG. 2 is a diagrammatic view, as seen in a direction of arrow Z in FIG. 1, of the channel reinforcement with a connection to the B pillar of the body structure.
Figure 3:
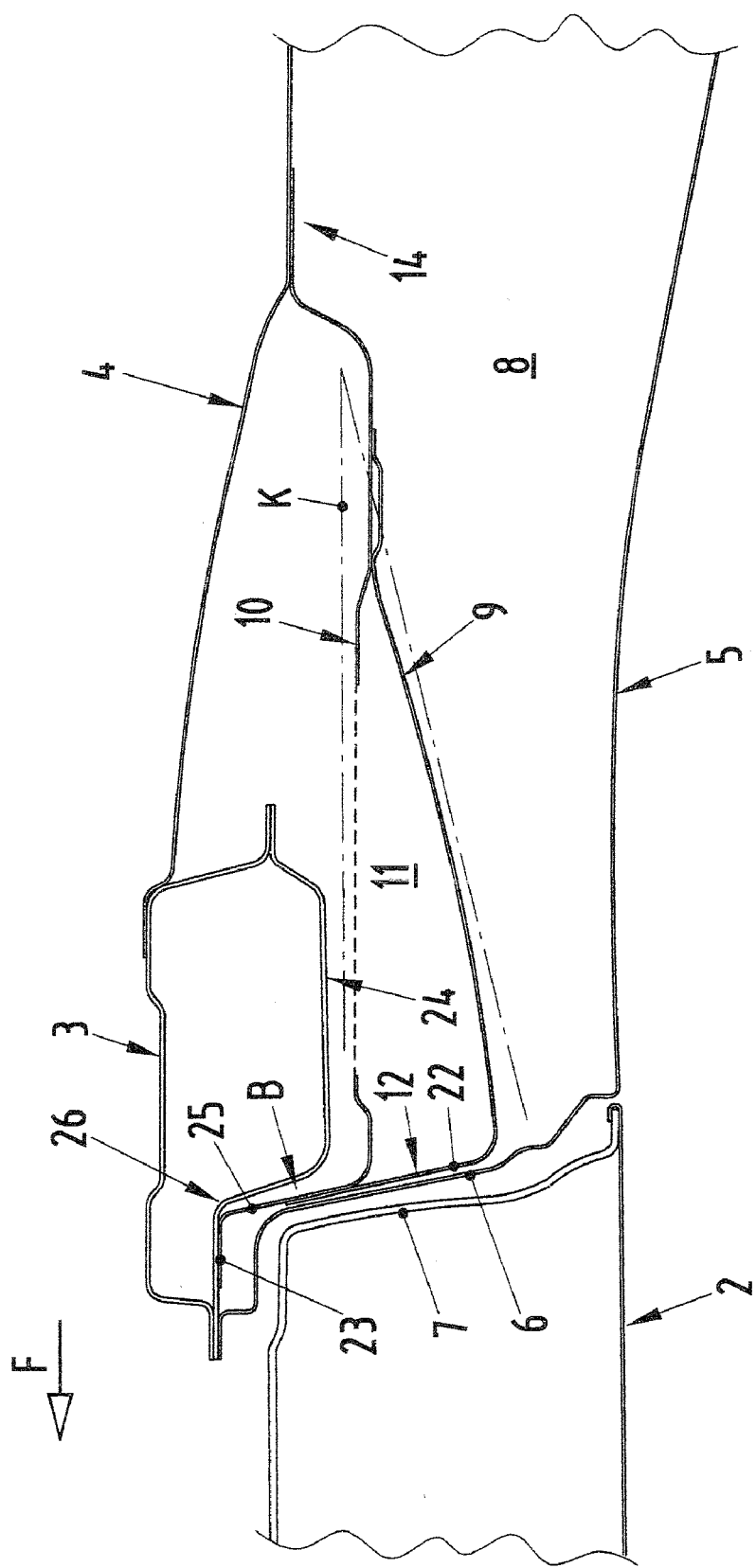
FIG. 3 is a horizontal, sectional view through the body structure taken along the line III-III shown in FIG. 1, with side parts and channel reinforcements and also the B pillar and adjoining side front door.
Figure 4:
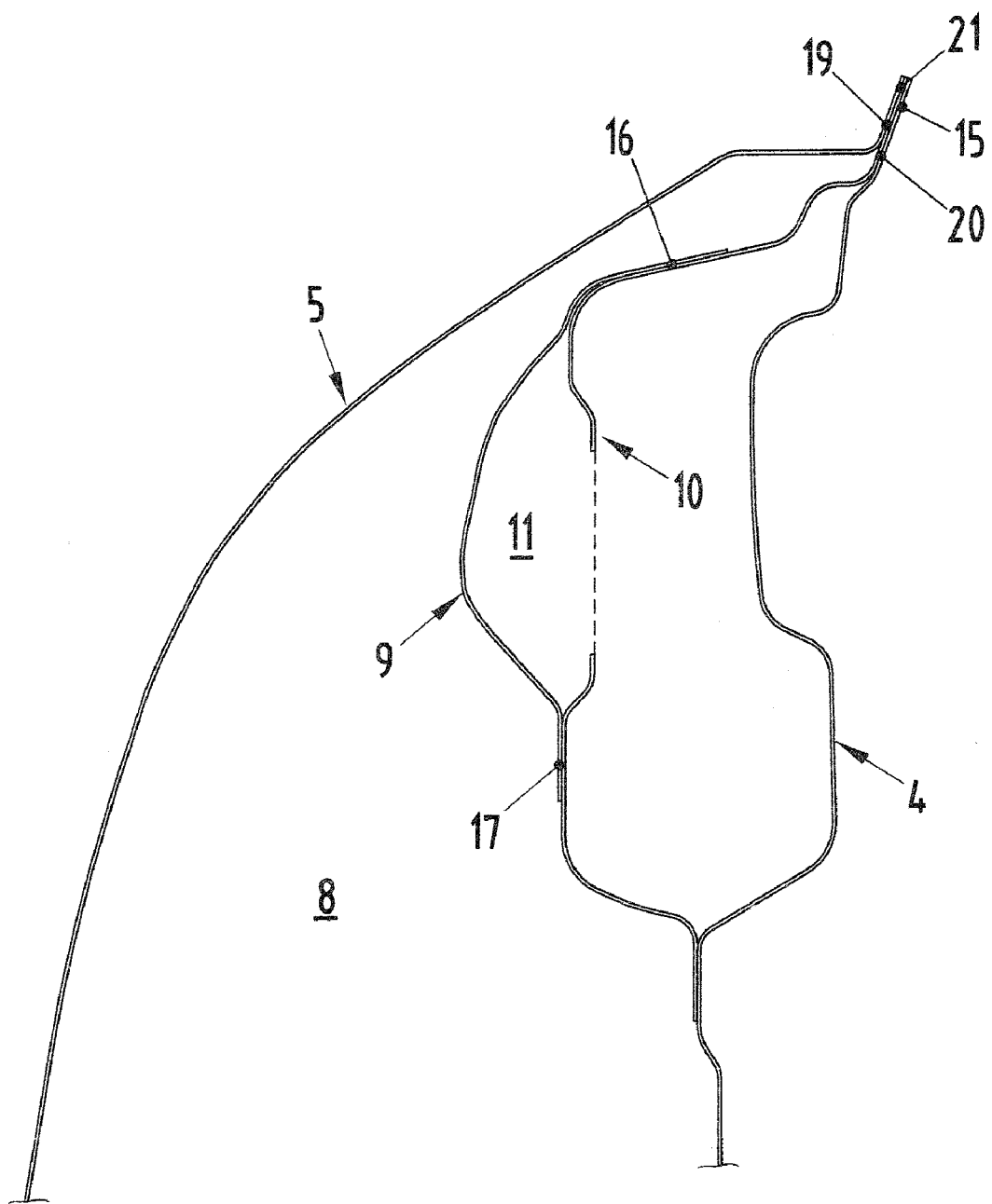
FIG. 4 is a vertical, sectional view through the body structure taken along the line II-II shown in FIG. 1, with the side parts and the channel reinforcements.

Referring now to the figures of the drawing in detail and first, particularly, to FIGS. 1 and 3 thereof, there is shown a body structure 1 for a motor vehicle that includes substantially a side door 2 which is fastened by hinges to an A pillar and which is held in a lockable fashion on a profiled B pillar 3 by a door lock. An inner side part 4 and an outer side part 5 are connected to the B pillar 3. A connection of the outer side part 5 to the B pillar 3 takes place by a front turned-up limb 6 which is situated a short distance opposite a rear web plate 7 of the closed door 2. A hollow member structure 11 composed of two channel reinforcements 9, 10 is arranged in a channel 8 of the body structure 1 between the inner side part 4 and the outer side part 5. The one channel reinforcement 9 is held supported on a front end 12 on the turned-up limb 6 of the outer side part 5, with a rear end 14 of at least one channel reinforcement 9, 10 being connected to the inner side part 4.

The channel reinforcements 9, 10 are composed of an inner channel reinforcement 10 and an outer channel reinforcement 9 which enclose a cavity of the hollow member structure 11. The hollow member structure 11 is arranged in the region of the body structure 1 directly below a lower window edge 15 of a rear side window—as viewed in relation to the direction of travel F—of the vehicle so as to run approximately in a horizontal plane x-x.

The channel reinforcements 9, 10 extend as a connected structural unit, with a structural shape K which tapers in the form of a wedge, from the front connection to the B pillar 3 and to the outer side part 5 up to the rear connection to the inner side part 4, as shown in more detail in the plan view in FIG. 3 by dash-dotted lines.

The two channel reinforcements 9, 10 are composed preferably of shaped profiled sheet-metal parts, with the outer channel reinforcement 9 being placed onto the inner channel reinforcement 10 and being connected by edge limbs 16, 17 to the inner channel reinforcement 10.

The inner channel reinforcement 10 has an upper turned-up edge 21 which is connected to turned-up limbs 19, 20 of the outer and inner side parts 5, 4, and the limbs 19, 20 and the upper turned-up edge 21 form the lower window edge 15 of the side window of the vehicle.

The inner channel reinforcement 10 has, at the front end 12, a limb 25 with an angled portion 23 which is connected to an outer profile 24 of the B pillar 3, with the limb 25 being supported areally on the turned-up limb 6 of the outer side part 5.

The outer channel reinforcement 9 engages at the outside in a domed fashion over the inner channel reinforcement 10 and is fastened to the inner channel reinforcement 10 by the edge limbs 16, 17. A front limb 25 of the inner channel reinforcement 10 is held supported areally at the inside on the turned-up limb 6 of the outer side part 5. In particular, the outer channel reinforcement 9 is held with the front limb 22 on the limb 25 of the inner channel reinforcement 10, and both limbs 22 and 25 are supported together at the inside on the turned-up limb 6 of the side wall 5, or the outer limb 6 is held supported on the two limbs 22 and 25 of the channel reinforcement 9, 10.

The channel reinforcements 9, 10 directly adjoin the turned-up limbs 6 of the outer side part 9 and the B pillar 3. The limb 25 of the inner channel reinforcement 10 is supported with a region B of its limb 25 in an inwardly molded portion 26 of the B pillar 3. The direct connection of the front end 12 of the channel reinforcements 9, 10 to the outer side part which is situated opposite the rear web plate 7 of the door results in a direct introduction of force and support of forces arising from a crash.

The invention claimed is:

1. A body structure for a motor vehicle, the body structure comprising:
   a profiled B pillar;
   a side door to be fastened to a further body pillar, said side door being connected to said profiled B pillar and having a rear web plate;
   an inner side part;
   an outer side part, said outer side part having a turned up limb in a direction of said B pillar, a short distance opposite said rear web plate of said side door in a closed position, said inner side part and said outer side part together defining a channel therebetween, said outer and inner side parts having further turned-up-limbs;
   a hollow member structure extending in a vehicle longitudinal direction and disposed in said channel between said inner and outer side parts, said hollow member structure formed from channel reinforcements being connected to one another, said channel reinforcements having a front end supported on said turned-up limb of said outer side part, said channel reinforcements having at least one rear end connected to said inner side part, said channel reinforcements composed of an inner channel reinforcement and an outer channel reinforcement connected to one another, enclosing a cavity, so as to form a structural unit forming said hollow member structure; and
   said channel reinforcements composed of profiled shaped sheet-metal parts, said inner channel reinforcement having an upper turned-up edge connected to said further turned-up limbs of said outer and inner side parts, said upper turned-up edge forming a lower window edge of a rear side window.

2. The body structure according to claim 1, wherein said hollow member structure formed by said channel reinforcements is disposed in a region of the body structure directly below said lower window edge or below a belt line of the motor vehicle, approximately in a horizontal plane of said rear side window—as viewed in relation to a direction of travel—of the motor vehicle.

3. A body structure for a motor vehicle, the body structure comprising:
   a profiled B pillar having an outer profile;
   a side door to be fastened to a further body pillar, said side door being connected to said profiled B pillar and having a rear web plate;
   an inner side part;
   an outer side part, said outer side part having a turned up limb in a direction of said B pillar, a distance opposite said rear web plate of said side door in a closed position, said inner side part and said outer side part together defining a channel therebetween;

a hollow member structure extending in a vehicle longitudinal direction and disposed in said channel between said inner and outer side parts, said hollow member structure formed from channel reinforcements being connected to one another, said channel reinforcements having a front end supported on said turned-up limb of said outer side part, said channel reinforcements having at least one rear end connected to said inner side part, said channel reinforcements composed of an inner channel reinforcement and an outer channel reinforcement connected to one another, enclosing a cavity, so as to form a structural unit forming said hollow member structure;

said inner channel reinforcement containing a front end having a front limb with an angled portion connected to said outer profile of said B pillar, said front limb supported areally at an inside on said turned-up limb of said outer side part; and said outer channel reinforcement engages at an outside over said inner channel reinforcement and said outer channel reinforcement has edge limbs connected to said inner channel reinforcement, said front limb of said inner channel reinforcement is supported areally at an inside on said turned-up limb of said outer side part.

4. The body structure according to claim 3, wherein said outer channel reinforcement has a front limb held on said front limb of said inner channel reinforcement, and both said front limbs are held supported together at an inside on said turned-up limb of said outer side part.

5. The body structure according to claim 1, wherein said channel reinforcements which form said hollow member structure have a structural shape which tapers in a form of a wedge from a front connection to said B pillar and to said outer side part up to a rear connection to said inner side part.

6. A body structure for a motor vehicle, the motor vehicle having a profiled B pillar and a side door to be fastened to a further body pillar, the side door being connected to the profiled B pillar and having a rear web plate, the body structure comprising:

an inner side part;

an outer side part, said outer side part having a turned up limb in a direction of the B pillar, a short distance opposite the rear web plate of the side door in a closed position, said inner side part and said outer side part together defining a channel therebetween, said outer and inner side parts having further turned-up-limbs;

a hollow member structure extending in a vehicle longitudinal direction and disposed in said channel between said inner and outer side parts, said hollow member structure formed from channel reinforcements being connected to one another, said channel reinforcements having a front end supported on said turned-up limb of said outer side part, said channel reinforcements having at least one rear end connected to said inner side part, said channel reinforcements composed of an inner channel reinforcement and an outer channel reinforcement connected to one another, enclosing a cavity, so as to form a structural unit forming said hollow member structure; and said channel reinforcements further composed of profiled shaped sheet-metal parts, said inner channel reinforcement having an upper turned-up edge connected to said further turned-up limbs of said outer and inner side parts, said upper turned-up edge forming a lower window edge of a rear side window.

* * * * *